(12) United States Patent
Mugundan et al.

(10) Patent No.: US 8,627,412 B2
(45) Date of Patent: *Jan. 7, 2014

(54) TRANSPARENT DATABASE CONNECTION RECONNECT

(75) Inventors: Balendran Mugundan, Redmond, WA (US); Peter Gvozdjak, Sammamish, WA (US); Sapna Jeswani, Seattle, WA (US); Jimmy Yu Wu, Bellevue, WA (US); Raghu Ram, Redmond, WA (US); Chadwin James Mumford, Woodinville, WA (US); David Olix, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/086,959

(22) Filed: Apr. 14, 2011

(65) Prior Publication Data

US 2012/0266211 A1    Oct. 18, 2012

(51) Int. Cl.
  *G06F 7/04*  (2006.01)

(52) U.S. Cl.
  USPC .............. 726/3; 714/3; 714/E11.11; 709/203; 709/219

(58) Field of Classification Search
  USPC ............ 726/3; 714/3, E11.113; 709/203, 219
  See application file for complete search history.

(56) References Cited

U.S. PATENT DOCUMENTS

| | | | |
|---|---|---|---|
| 6,202,169 B1 * | 3/2001 | Razzaghe-Ashrafi et al. | 714/6.31 |
| 6,286,104 B1 | 9/2001 | Buhle et al. | |
| 6,308,281 B1 * | 10/2001 | Hall et al. | 714/4.4 |
| 6,310,884 B1 | 10/2001 | Odenwald, Jr. | |
| 6,421,688 B1 | 7/2002 | Song | |
| 6,560,630 B1 | 5/2003 | Vepa et al. | |
| 6,654,373 B1 | 11/2003 | Lie | |
| 6,697,868 B2 | 2/2004 | Craft et al. | |
| 6,801,914 B2 | 10/2004 | Barga | |
| 6,804,815 B1 | 10/2004 | Kerr | |
| 7,007,103 B2 | 2/2006 | Pinkerton et al. | |
| 7,027,439 B1 | 4/2006 | Barrow et al. | |
| 7,437,547 B2 | 10/2008 | Hyder et al. | |
| 7,477,644 B2 | 1/2009 | Georgiou et al. | |
| 7,545,741 B1 | 6/2009 | Manickavasagam et al. | |
| 7,590,755 B2 | 9/2009 | Pinkerton et al. | |
| 7,639,624 B2 | 12/2009 | McGee et al. | |
| 7,643,427 B2 | 1/2010 | Kokku | |
| 7,673,074 B1 | 3/2010 | Sebastian | |
| 7,673,168 B2 | 3/2010 | Matsuda | |
| 7,689,702 B1 | 3/2010 | Tripathi et al. | |

(Continued)

OTHER PUBLICATIONS

Saibal, "Failover and Load Balancing in Oracle", Apr. 20, 2007, 8 pages.

(Continued)

*Primary Examiner* — Amare F Tabor
(74) *Attorney, Agent, or Firm* — Workman Nydegger

(57) ABSTRACT

A first computer establishes a logical connection to a second computer for requesting and/or receiving data from a database. A logical connection is independent of the underlying physical network connection used to connect to the database. A context identifier is stored by both computers to enable the context of a logical connection to be persisted between switches from one physical network connection to another within the logical connection thus enabling database transfers to be continued on a second physical network connection when a failure in a first physical network connection occurs.

20 Claims, 5 Drawing Sheets

(56) References Cited

U.S. PATENT DOCUMENTS

| | | | |
|---|---|---|---|
| 7,835,369 | B2 | 11/2010 | Hu et al. |
| 7,849,208 | B2 | 12/2010 | Elzur et al. |
| 7,873,984 | B2 * | 1/2011 | Hammons et al. ............... 726/1 |
| 7,876,689 | B2 | 1/2011 | McGee |
| 7,912,064 | B2 | 3/2011 | Elzur |
| 7,966,405 | B2 * | 6/2011 | Sundaresan et al. .......... 709/227 |
| 8,068,498 | B2 | 11/2011 | Chiba |
| 8,134,928 | B1 | 3/2012 | Manickavasagam et al. |
| 8,155,158 | B2 | 4/2012 | Saavedra |
| 8,285,881 | B2 | 10/2012 | Elzur |
| 8,291,489 | B2 * | 10/2012 | Droms et al. .................. 726/15 |
| 8,300,647 | B2 | 10/2012 | Abdulla et al. |
| 8,369,349 | B2 | 2/2013 | Martinez |
| 2003/0108066 | A1 | 6/2003 | Trippe |
| 2004/0044796 | A1 | 3/2004 | Vangal |
| 2006/0098573 | A1 | 5/2006 | Beer et al. |
| 2006/0153238 | A1 | 7/2006 | Bar-On et al. |
| 2006/0227703 | A1 | 10/2006 | Hung et al. |
| 2006/0268866 | A1 | 11/2006 | Lok |
| 2008/0016511 | A1 | 1/2008 | Hyder |
| 2008/0189433 | A1 | 8/2008 | Nelson et al. |
| 2009/0063509 | A1 | 3/2009 | Lockhart |
| 2009/0086736 | A1 | 4/2009 | Foong |
| 2009/0119536 | A1 | 5/2009 | Guo |
| 2009/0248950 | A1 * | 10/2009 | Tamaki et al. .................... 711/6 |
| 2011/0019553 | A1 | 1/2011 | Tripathi et al. |
| 2011/0202667 | A1 * | 8/2011 | Kimball et al. ............... 709/228 |
| 2012/0210169 | A1 * | 8/2012 | Coile et al. ...................... 714/22 |
| 2012/0265801 | A1 | 10/2012 | Mugundan et al. |
| 2013/0114606 | A1 | 5/2013 | Schrum et al. |

OTHER PUBLICATIONS

Prabhu S & Venkat R., "High Availability for Network Management Applications", 2007 IEEE, 6 pages.

Juniper Networks, "VPN Resiliency", Jun. 2006, 3 pages.

Oracle Data Provider for .NET Developer's Guide, "Connecting to the Oracle Database", Based on information and belief available, at least as early as Jan. 31, 2011, 7 pages.

"Highly Available Databases", at least as early as Jan. 31, 2011, 4 pages.

Bytes, "Reestablishing a db Connection After a Network Failure", 2005, 3 pages.

Gibb, Allan, Dr., "Data Replication in Low Bandwidth Military Environments—State of the Art Review", at least as early as Jan. 31, 2011, 10 pages.

Oracle, "Recovering from a Server Failure", at least as early as Jan. 31, 2011, 12 pages.

U.S. Appl. No. 13/086,272, filed Apr. 13, 2011, Mugundan.

U.S. Appl. No. 13/086,269, filed Apr. 13, 2011, Mugundan.

Nishijima, Takamichi, et al., On Maximizing IP-SAN Throughput over TCP Connections with Automatic Parallelism Tuning for Long-Fat Networks, 2009 Ninth Annual International Symposium on Applications and the Internet, 2009 IEEE, pp. 251-254.

Business Wire, "Ecessa Enables SMEs to Maximize Bandwidth from Multiple Internet Links to Support Bandwidth-Consuming Applications", Sep. 15, 2009, 3 pages.

Inoue, Fumito, et al., "On Maximizing iSCSI Throughput Using Multiple Connections with Automatic Parallelism Tuning", 2008, 6 pages.

Ito, Takeshi, et al., "GridFTP-APT: Automatic Parallelism Tuning Mechanism for Data Transfer Protocol GridFTP", 2006, 8 pages.

Zhang, Junyu, et al., "To Improve Throughput Via Multi-Pathing and Parallel TCP on Each Path," 2009 Fourth ChinaGrid Annual Conference, Nov. 17, 2009, pp. 16-21.

Naldini, Andrea, et al., "Increasing Performance of TCP Data Transfers through Multiple Parallel Connections", 2009, 7 pages.

Fiore, M., et al., "Concurrent Multipath Communication for Real-Time Traffic", Dec. 2006, pp. 3307-3320.

Schlansker, Michael, et al., "High-Performance Ethernet-Based Communications for Future Multi-Core Processors", Nov. 16, 2007, 12 pages.

Office Action dated Feb. 15, 2013 cited in U.S. Appl. No. 13/086,269.

Office Action dated Feb. 12, 2013 cited in U.S. Appl. No. 13/086,272.

Office Action dated Jul. 15, 2013 cited in U.S. Appl. No. 13/086,272.

West et al., "TCP/IP Field Behavior", Network Working Group, Mar. 2006, pp. 1-42.

Postel, "The TCP Maximum Segment Size and Related Topics", Network Working Group, Nov. 1983, pp. 1-11.

Office Action dated Sep. 25, 2013 cited in U.S. Appl. No. 13/086,269.

Notice of Allowance dated Nov. 15, 2013 cited in U.S. Appl. No. 13/086,272.

* cited by examiner

TRANSPARENT DATABASE CONNECTION RECONNECT

CROSS-REFERENCE TO RELATED APPLICATIONS

Not Applicable.

BACKGROUND

Background and Relevant Art

Generally when a user establishes a connection to a database to send or receive data, the database client creates a single physical connection (e.g. a TCP/IP socket connection) to the database, over a single network device. This single physical connection is mapped to the database connection at the application level. Because of this, if the physical connection fails for any reason (e.g. hardware failure, network failure, etc.), the database connection from the application's perspective fails also. Thus, a new database connection must be established and the transfer of data restarted.

Further, many computing devices contain multiple physical network devices. For example, a computer can contain an Ethernet network interface card, an 802.11 network interface card, and oftentimes other network interface cards. A physical connection may be established using any of the multiple physical network devices. However, current approaches do not provide a way to begin a database transfer over one physical connection, and then switch to another physical connection to continue the database transfer.

BRIEF SUMMARY

The present invention extends to methods, systems, and computer program products for transparently reconnecting database connections within a logical connection. The invention also extends to methods, systems, and computer program products for establishing multiple database connections within the context of a single logical connection.

In one embodiment, a first computer requests a first database connection over a first physical network connection to a second computer. The first computer receives a response indicating that a first database connection is established. The response includes a context identifier which is stored by the first and second computers to identify a logical connection between the first and second computers. The first computer receives packets of a database transfer from the second computer over the first physical network connection. In response to a failure in the first physical network connection during the database transfer, the first computer requests a second database connection over a second physical network connection within the logical connection to the second computer. The request for the second database connection includes the context identifier of the logical connection to enable the second database connection to be established with the context of the logical connection as it existed when the first physical network connection failed. The first computer then receives further packets of the database transfer over the second physical network connection of the logical connection.

In another embodiment, a first computer requests a first database connection over a first physical network connection to a second computer. The first computer receives a response indicating that a first database connection is established. The response includes a context identifier which is stored by the first and second computers to identify a logical connection between the first and second computers. While the first physical network connection is established, the first computer requests a second database connection over a second physical network connection within the logical connection to the second computer. The request for the second database connection includes the context identifier of the logical connection to enable the second database connection to be established with the context of the logical connection. The first computer receives packets of a database transfer from the second computer over the first physical network connection. In response to a failure in the first physical network connection while the first computer is receiving packets of a database transfer over the first physical network connection, the first computer commences to receive further packets of the database transfer over the second physical network connection of the logical connection.

In another embodiment, a database server receives a request for a first database connection from a client computer over a first physical network connection. The database server establishes the first database connection with the client computer and associates a context identifier with the first database connection to identify a logical connection between the database server and the client computer. The database server caches the context identifier in conjunction with the context of the logical connection between the database server and the client computer. The database server receives a request for a second database connection from the client computer over a second physical network connection. The request for the second database connection includes the context identifier of the logical connection. The database server establishes the second database connection and associates the context of the logical connection with the second database connection. In response to a database request received from the client computer over the first physical network connection, the database server sends packets of a database response to the client computer over the first physical network connection. Upon detecting a failure in the first physical network connection, the database server switches to the second physical network connection to send the database response to the client computer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example computer architecture in which database connections are established within a logical connection according to one embodiment of the invention.

DETAILED DESCRIPTION

Figure 1:
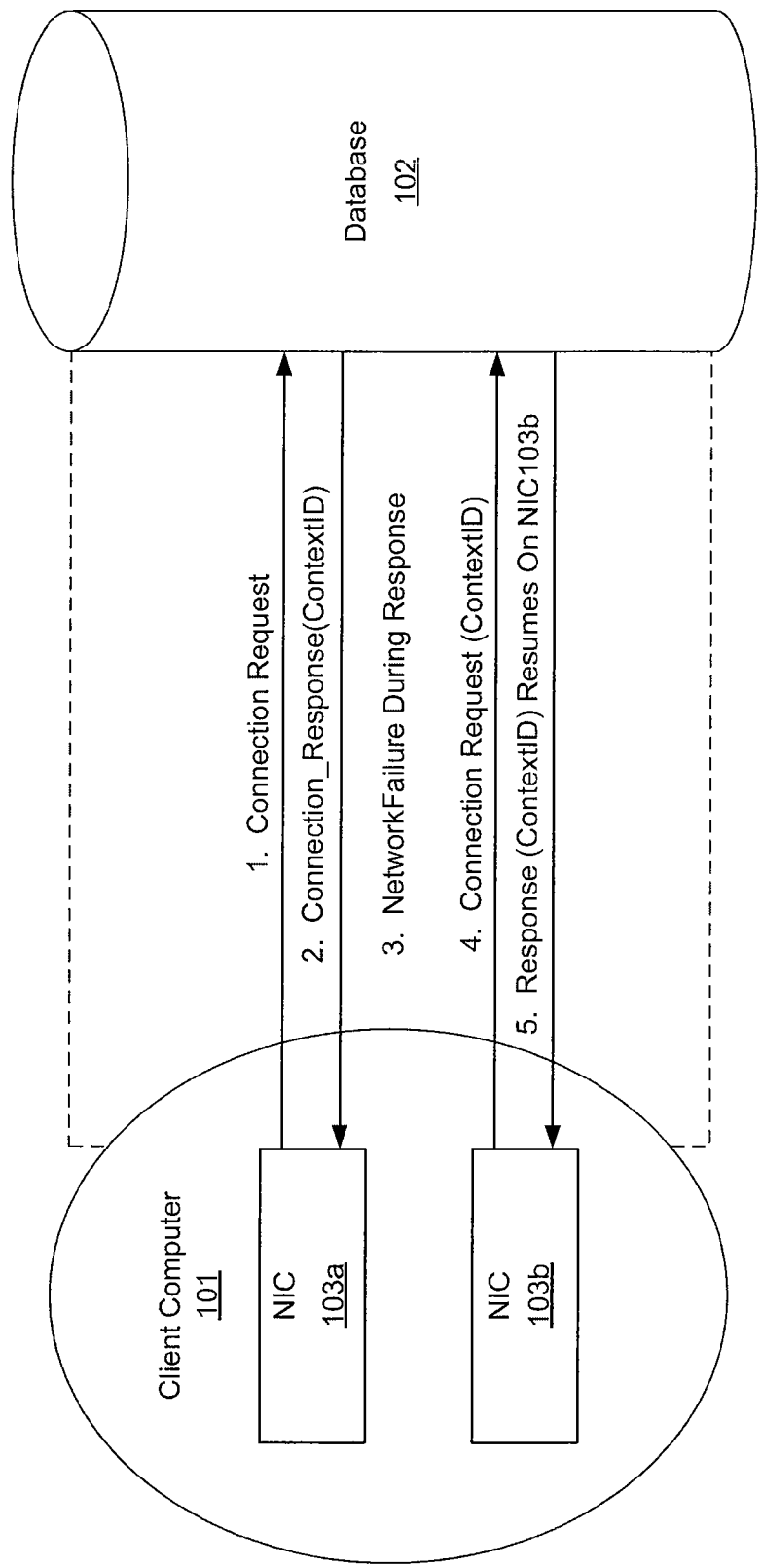

The present invention extends to methods, systems, and computer program products for transparently reconnecting database connections within a logical connection. The invention also extends to methods, systems, and computer program products for establishing multiple database connections within the context of a single logical connection.

In one embodiment, a first computer requests a first database connection over a first physical network connection to a second computer. The first computer receives a response indicating that a first database connection is established. The response includes a context identifier which is stored by the first and second computers to identify a logical connection between the first and second computers. The first computer receives packets of a database transfer from the second computer over the first physical network connection. In response to a failure in the first physical network connection during the database transfer, the first computer requests a second database connection over a second physical network connection within the logical connection to the second computer. The request for the second database connection includes the context identifier of the logical connection to enable the second database connection to be established with the context of the logical connection as it existed when the first physical network connection failed. The first computer then receives further packets of the database transfer over the second physical network connection of the logical connection.

In another embodiment, a first computer requests a first database connection over a first physical network connection to a second computer. The first computer receives a response indicating that a first database connection is established. The response includes a context identifier which is stored by the first and second computers to identify a logical connection between the first and second computers. While the first physical network connection is established, the first computer requests a second database connection over a second physical network connection within the logical connection to the second computer. The request for the second database connection includes the context identifier of the logical connection to enable the second database connection to be established with the context of the logical connection. The first computer receives packets of a database transfer from the second computer over the first physical network connection. In response to a failure in the first physical network connection while the first computer is receiving packets of a database transfer over the first physical network connection, the first computer commences to receive further packets of the database transfer over the second physical network connection of the logical connection.

In another embodiment, a database server receives a request for a first database connection from a client computer over a first physical network connection. The database server establishes the first database connection with the client computer and associates a context identifier with the first database connection to identify a logical connection between the database server and the client computer. The database server caches the context identifier in conjunction with the context of the logical connection between the database server and the client computer. The database server receives a request for a second database connection from the client computer over a second physical network connection. The request for the second database connection includes the context identifier of the logical connection. The database server establishes the second database connection and associates the context of the logical connection with the second database connection. In response to a database request received from the client computer over the first physical network connection, the database server sends packets of a database response to the client computer over the first physical network connection. Upon detecting a failure in the first physical network connection, the database server switches to the second physical network connection to send the database response to the client computer.

A logical connection includes one or more physical network connections that may be concurrently or consecutively established. Whether concurrently or consecutively established, multiple physical network connections may be established using the same or different physical network devices. A logical connection functions to abstract the underlying physical connection from the database connection at the application level. Thus, a switch from one physical network connection to another is transparent to the application.

In other words, the application views the logical connection as the database connection whether the logical connection includes one or more physical network connections. Unlike previous approaches where the database connection was mapped one-to-one to the underlying physical connection, a logical connection according to the invention is separate from the underlying one or more physical network connections that make up the logical connection.

Because the logical connection abstracts the physical network connection(s) from the database connection, a logical connection is able to persist through physical network connection failures. For example, as further described below, a physical network connection within the logical connection may fail, but may be reestablished within the logical connection so that it appears to the application that the database connection did not fail (i.e. a data transfer over the database connection does not have to be restarted or resent). Similarly, a logical connection allows multiple physical network connections to be concurrently established and utilized within a single logical connection. For example, as further described below, a logical connection may establish a primary and a secondary physical network connection. The secondary physical network connection may serve as a backup that is switched to continue a data transfer if the primary physical network connection fails.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed by a general purpose or special purpose computer.

A "network" is defined as one or more data links that enable the transport of electronic data between computers and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer RAM and/or to less volatile computer storage media (devices) at a computer. Thus, it should be understood that computer storage media (devices) can be included in computer components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computers, which are linked (either by hardwired data links, wireless data links, or by a combination of hardwired and wireless data links) through a network, both perform tasks. In a distributed system environment, program modules may be located in both local and remote memory storage devices.

A logical connection as referred to in this specification refers to the overall connection from the application perspective between a first and a second computer. A logical connection may include one or more physical network connections. When a logical connection uses multiple physical network connections (whether concurrently or consecutively established or both), each physical network connection is associated with the same context. In other words, a logical connection makes it possible to view multiple database connections as a single connection. Therefore, a logical connection is different from a traditional database connection in that the logical connection does not have a one-to-one mapping to the underlying physical network connection.

The logical connection is represented by a context ID that is cached by the computers on both ends of the connection. Because the logical connection is not tied to the underlying physical network connection, if a physical connection fails, the logical connection can be maintained by reestablishing the physical network connection (either by using the same network interface card (NIC), or establishing a physical network connection using a different NIC) and associating it with the same context ID.

Further, by representing a logical connection with a context ID, a logical connection may comprise multiple physical network connections whether established concurrently or consecutively (i.e. establishing a second physical connection after a first physical connection fails). For example, a client computer can establish two or more separate physical network connections to a database server within the same logical connection. Each of the physical network connections in the logical connection will share the same context ID. Thus, from the perspective of the application, it appears as though a single database connection exists even though multiple physical network connections are being used to send and receive data from the database server.

An example logical connection comprises one or more physical connections between a client computer and a database server when the client computer submits a database request to the database server. The client computer may contain multiple physical network devices that are each individually capable of establishing a physical network connection to send and/or receive data. The database server responds to the client computer's database request by creating a response (e.g. rows of data from the database) that is divided into packets. These packets are sent to the client computer. Different packets of the response may be sent to different endpoints (i.e. physical network devices) exposed at the client computer as will be further described below with reference to FIGS. 1 and 2.

Although the above example describes a logical connection between a client computer and a database server, the present invention extends to logical connections between any two computers connected in any network topology such as client/server and peer-to-peer. For example, a computer having both an Ethernet network interface card (NIC) and an 802.11 NIC can expose different IP addresses for each NIC. Embodiments of the invention can send packets of a database response to each of the NICs. One NIC could establish a connection after the other NIC's connection fails (such as in FIG. 1 described below), or both NICs could establish a physical connection concurrently (such as in FIG. 2 described below).

Two or more physical network devices of the same type (e.g. two Ethernet NICs) could also be used to establish the logical connection. The invention is not limited to any particular network packet routing protocol. Any network packet routing protocol can be used for any of the individual network connections. Further, different physical network connections within the same logical connection can use different network packet routing protocols.

When a logical connection is established, a client computer, in addition to receiving database responses, can also send database requests over the logical connection. In such embodiments, if a database request being sent over one physical connection of a logical connection is interrupted (due to a failure in the physical connection), the client computer can continue transmitting the database request over the logical connection either by switching to another physical connection of the logical connection if one has already been established, or by establishing another physical connection whether using the same or a different NIC or other network device. Because the context ID of the logical connection is used to establish any physical connection of the logical connection, the context of the logical connection is maintained through connection failure and switching.

FIG. 1 illustrates an example computer architecture in which database connections are established according to one embodiment of the invention. As shown, client computer 101 requests a database connection to database server 102 over NIC 103a. Database server 102 establishes the connection and returns a context ID to client computer 101. Both client computer 101 and database server 102 cache the context ID. The context ID is used to identify the logical connection between client computer 101 and database server 102.

Although FIG. 1 shows that the context ID is created by the database server, in some embodiments of the invention, the initial request from the client may specify a context ID to the database server or information from which the database server generates the context ID. In such embodiments, the database server may not need to include the context ID in the connection response.

After the logical connection is established, the underlying physical connection between client computer 101 and database server 102 fails. For example, NIC 103a over which the physical connection was established may fail. In response, client computer 101 requests another database connection to database server 102. This request includes the context ID that identifies the logical connection. When the database server 102 receives the request and identifies the context ID, the database server will reestablish the logical connection with client computer 101 using the physical network connection to NIC 103b. In this manner, the same logical connection is maintained even though the underlying physical network connection is switched from NIC 103a to NIC 103b. This process can be repeated as necessary any time a physical network connection fails. In other words, a logical connection may include any number of physical network connections which may be switched to at any time.

In some embodiments, a database server may be configured to store context IDs for a specified duration after which they become invalid. If a connection attempt is made by a client computer during this duration which specifies a context ID that the database server is storing and is still valid, the database server may automatically create a connection and associate the stored context identified by the context ID with the connection.

In the example logical connection of FIG. 1, the second physical connection is established using a different NIC. However, the same NIC may be used to establish the second physical connection. For example, NIC 103a can be used to establish the second connection after the first connection fails.

As also shown in FIG. 1, packets of a data transfer using a logical connection may be individually identified with an identifier. Identifiers may be used to synchronize the transfer of data between client computer 101 and database server 102. For example, when sending a response to client computer 101, database server 102 may track which packets it has sent over the logical connection. Then, when the physical network connection fails between client computer 101 and database server 102, database server can compare the identifiers of the packets it has sent to the identifiers of the packets the client computer 101 has received. If the comparison shows that some packets were not received (such as due to the connection failure), the database server 102 may resend the packets that were not received by client computer 101.

Figure 2:
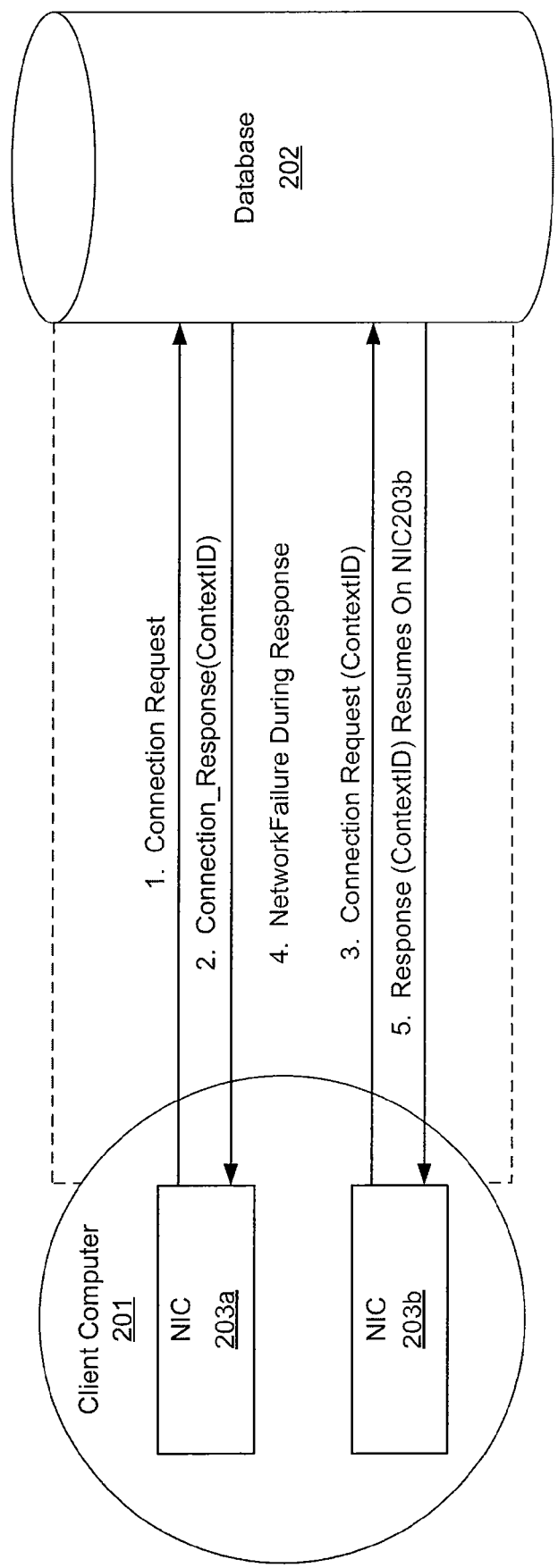
FIG. 2 illustrates an example computer architecture in which database connections are established within a logical connection according to another embodiment of the invention.

FIG. 2 is similar to FIG. 1, but shows how a second physical connection can be established within the logical connection before the first connection fails. This figure illustrates that the timing of establishing additional physical connections within a logical connection is independent of the status of any other physical connection. As shown, FIG. 2 differs from FIG. 1 in that client computer 201 establishes a second physical connection via NIC 203b to database server 202 prior to the first physical connection via NIC 203a failing. This second physical connection uses the same context ID as the first physical connection. After the failure of the first physical connection, client computer 201 and database server 202 switch to the second physical connection to continue the data transfer. Although FIG. 2 only shows two physical connections within the logical connection, the logical connection may contain any number of physical connections included both concurrently and consecutively established connections.

The context ID may represent various types of contextual information. For example, the context ID may represent one or more of a logical connection level context, a command level context, or a resultsets level context. The logical connection level context may include the current database, transactions, and the like. The command level context may include prepared statement handles. The resultsets level context may include the current cursor position. The context ID may be represented as a globally unique identifier (GUID).

When a client computer requests a physical connection to a database server that includes a context ID, the database server compares the context ID to context IDs that are cached on the server. When a cached context ID is found that matches the context ID included in the request, the database server will establish the physical network connection with the client computer with the same context as defined by the matching context ID.

For example, if the request is received after a previous physical connection with the client computer has failed, the context ID will identify the context of the logical connection at the time of the failure. In this manner, the database server may continue a data transfer with the client computer that was interrupted by the failure in the previous physical connection.

Additionally, if the request is received while another physical connection exists within a logical connection between the client computer and the database server, the context ID will indicate the context of the logical connection (which may include multiple concurrently used physical connections as further described below). Then if one of the physical connections in the logical connection fails, another of the physical connections can be switched to to continue a data transfer with a generally undetectable interruption from the application's perspective.

When connections to the database server require authentication, the mechanism used to authenticate the initial connection of the logical connection may be included in the contextual information that is maintained by the database server. This allows the same authentication mechanism to be used to authenticate subsequent database connections made within the logical connection. This includes the server storing the original security context to enable the server to verify that the client computer's subsequent connection requests are made from the same security context as before.

Figure 3:
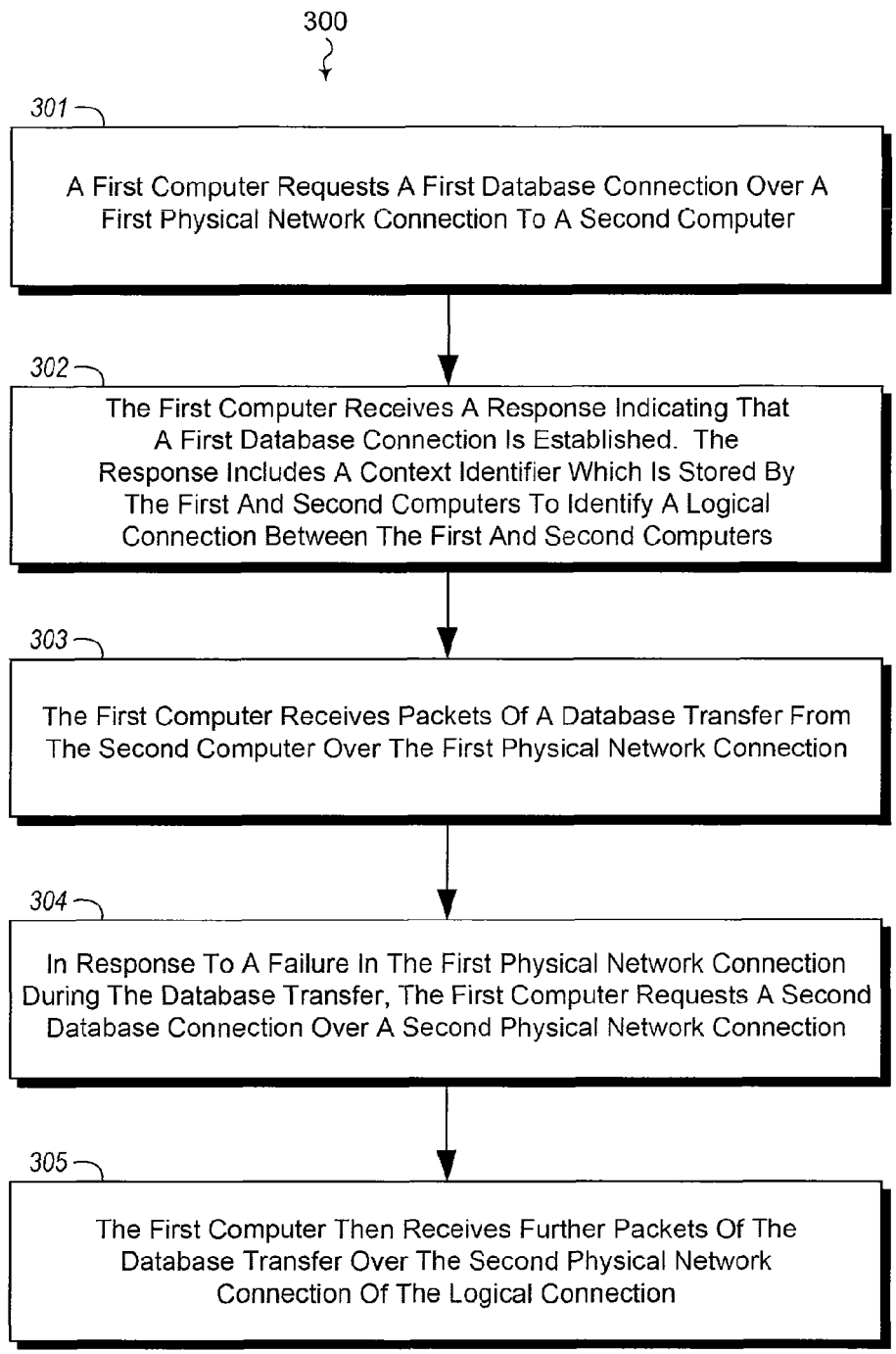
FIG. 3 illustrates a flowchart of a method for utilizing a logical connection according to one embodiment of the invention.

FIG. 3 provides a flowchart of a method 300 for establishing a second physical network connection within a logical connection after a first physical network connection within the logical connection fails. The method 300 will be described with reference to the computer architecture of FIG. 1. A first computer requests a first database connection over a first physical network connection to a second computer (act 301). For example, client computer 101 may request a database connection to database server 102 over NIC 103a. The first computer receives a response indicating that a first database connection is established (act 302). The response includes a context identifier which is stored by the first and second computers to identify a logical connection between the first and second computers. For example, client computer 101 can receive a response from database server 102 that includes a context identifier to identify a logical connection between client computer 101 and database server 102. The first computer receives packets of a database transfer from the second computer over the first physical network connection (act 303). For example, client computer 101 may receive packets of a database response from database server 102.

In response to a failure in the first physical network connection during the database transfer, the first computer requests a second database connection over a second physical network connection within the logical connection to the second computer (act 304). The request for the second database connection includes the context identifier of the logical connection to enable the second database connection to be established with the context of the logical connection as it existed when the first physical network connection failed. For example, client computer 101's network connection via NIC 103a may fail, and in response, client computer 101 may request another database connection via NIC 103b using the context identifier. The first computer then receives further packets of the database transfer over the second physical network connection of the logical connection (act 305). For example, client computer 101 may continue to receive packets of the database transfer via NIC 103b such that the database transfer is initially made over NIC 103a, but then switched to NIC 103b without losing the context of the database transfer.

In some embodiments of method 300, the first and second physical network connections are established via the same NICs on the first computer, whereas, in other embodiments, they are established via different NICs.

Figure 4:
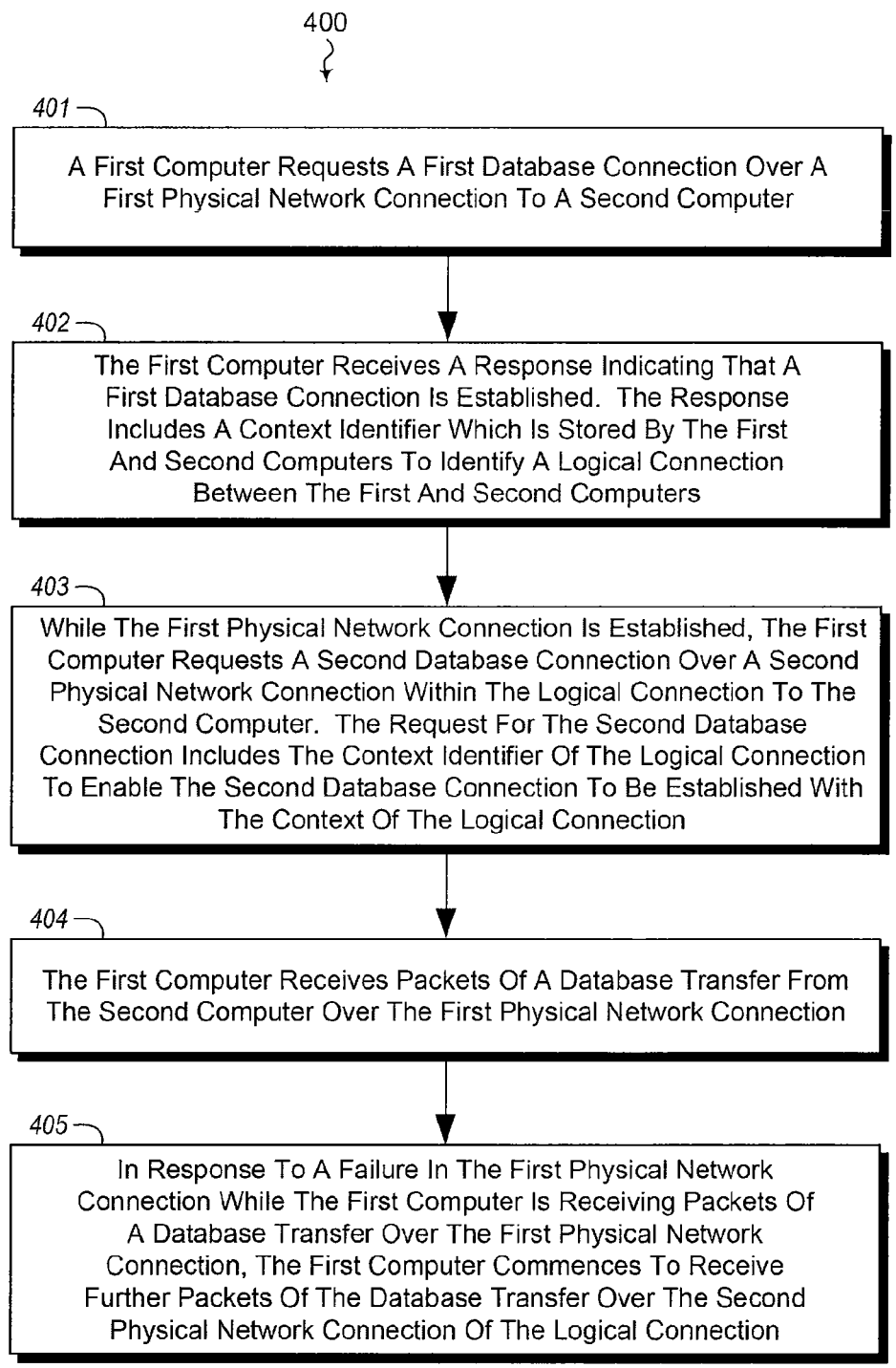
FIG. 4 illustrates a flowchart of a method for utilizing a logical connection according to another embodiment of the invention.

FIG. 4 provides a flowchart of a method 400 for switching to a second physical network connection within a logical connection when a first physical network connection within the logical connection fails. The method 400 will be described with reference to the computer architecture of FIG. 2. A first computer requests a first database connection over a first physical network connection to a second computer (act 401). For example, client computer 201 may request a database connection to database server 202 over NIC 203a. The first computer receives a response indicating that a first database connection is established (act 402). The response includes a context identifier which is stored by the first and second computers to identify a logical connection between the first and second computers. For example, client computer 201 can receive a response from database server 202 that includes a context identifier to identify a logical connection between client computer 201 and database server 202. While the first physical network connection is established, the first computer requests a second database connection over a second physical network connection within the logical connection to the second computer (act 403). The request for the second database connection includes the context identifier of the logical connection to enable the second database connection to be established with the context of the logical connection. For example, client computer 202 may request another database connection via NIC 203b using the context identifier. The first computer receives packets of a database transfer from the second computer over the first physical network connection (act 404). For example, client computer 201 may receive packets of a database response from database server 202. In response to a failure in the first physical network connection while the first computer is receiving packets of a database transfer over the first physical network connection, the first computer commences to receive further packets of the database transfer over the second physical network connection of the logical connection (act 405). For example, client computer 201's network connection via NIC 203a may fail, and in response, client computer 201 may continue receiving packets of the database transfer via NIC 203b.

Figure 5:
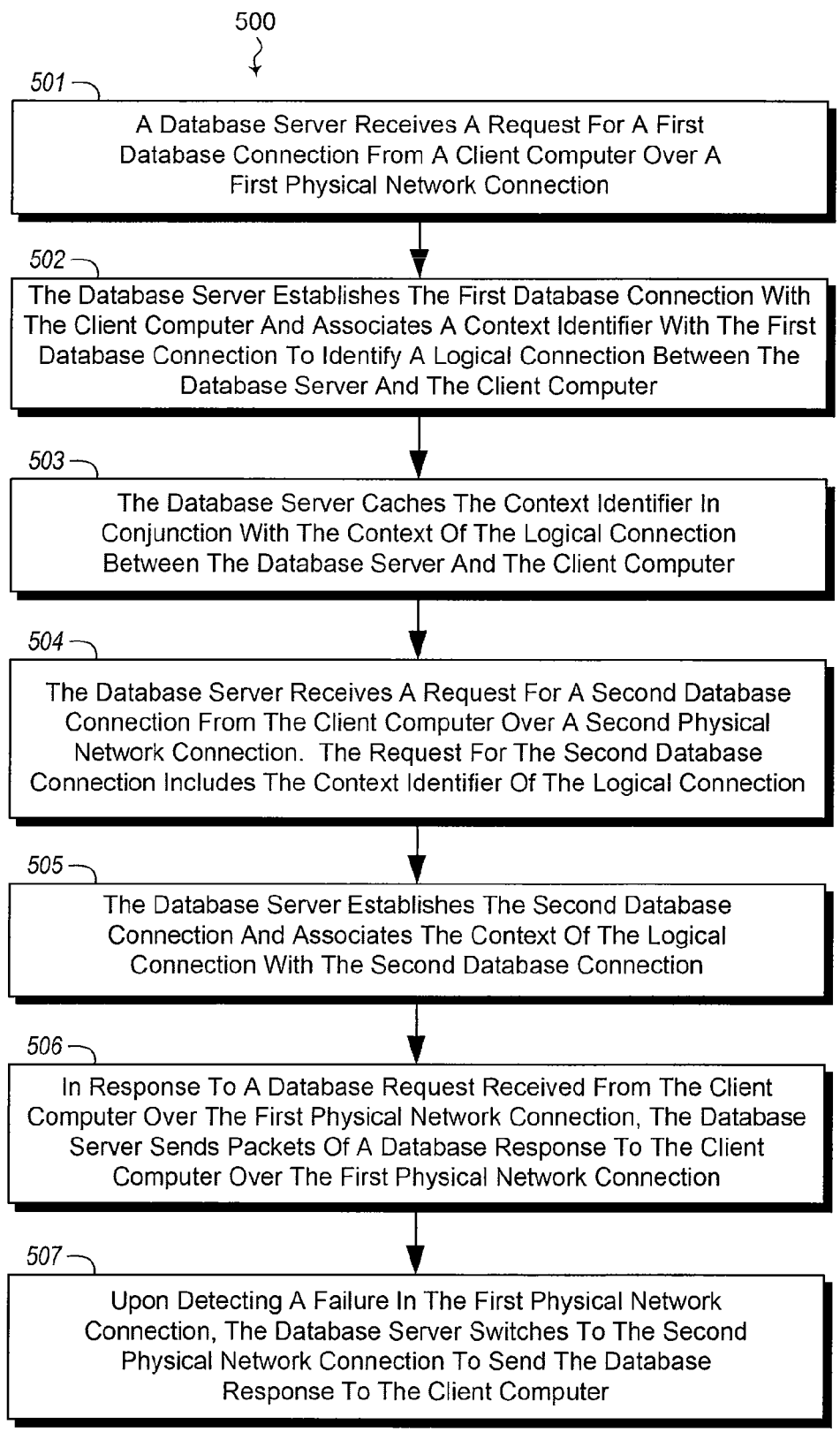
FIG. 5 illustrates a flowchart of a method for utilizing a logical connection according to another embodiment of the invention.

FIG. 5 provides a flowchart of a method 500 of switching from a first physical network connection to a second physical network connection to continue sending packets of a database response from a database server to a client computer. The method 500 is from the perspective of the database server and will be described with reference to the computer architecture of FIG. 2. However, method 500 could also be described with reference to the computer architecture of FIG. 1. In other words, method 500 applies to embodiments when the second network connection is established after the first network connection fails, as well as to embodiments when the second network connection is established before the first network connection fails.

In method 500, a database server receives a request for a first database connection from a client computer over a first physical network connection (act 501). For example, database server 202 receives a request for a first database connection from client computer 201. The database server establishes the first database connection with the client computer and associates a context identifier with the first database connection to identify a logical connection between the database server and the client computer (act 502). For example, database server 202 may generate a context identifier, or may receive a context identifier from client computer 201, to identify a logical connection between database server 202 and client computer 201 that includes the first database connection over a first physical network connection. The database server caches the context identifier in conjunction with the context of the logical connection between the database server and the client computer (act 503). For example, database server 202 may cache the context identifier to identify the logical connection to client computer 201.

The database server receives a request for a second database connection from the client computer over a second physical network connection (act 504). The request for the second database connection includes the context identifier of the logical connection. For example, database server 202 may receive a request for a second database connection from the client computer 201 that includes the context identifier. The database server establishes the second database connection and associates the context of the logical connection with the second database connection (act 505). For example, database server 202 may establish the second database connection within the logical connection such that the second database connection has the same context as the first database connection.

In response to a database request received from the client computer over the first physical network connection, the database server sends packets of a database response to the client computer over the first physical network connection (act 506). For example, database server 202 may send packets of a database response to client computer 201. Upon detecting a failure in the first physical network connection, the database server switches to the second physical network connection to send the database response to the client computer (act 507). For example, database server 202 may switch to the second database connection of the logical connection to continue sending packets of the database response to client computer 201.

In some embodiments of method 500, the request for the second database connection is received while the first physical network connection is still connected (and accordingly while the database response is being sent on the first database connection over the first physical network connection). In other embodiments, the request for the second database connection is received after the first physical network connection fails. The invention also extends to embodiments where multiple database connections are concurrently established over different physical network connections even before any database transfers are commenced. In other words, the invention is not limited to establishing second database connections during a database transfer. In the invention, additional (including two or more) database connections may be established within a single logical connection at any time. These database connections, because they are part of the same logical connection, share the same context.

In some embodiments of methods 300, 400, and 500, the request for the first database connection may include authentication criteria for authenticating the first computer (or client computer) to the second computer (or database server). In some such embodiments, the second computer may store the authentication criteria such that the request for the second database connection can be authenticated via the stored authentication criteria rather than requiring that the first computer supply the authentication criteria a second time.

Additionally, in some embodiments of methods 300, 400, and 500, some or all of the packets of the database transfer may include identifiers. The identifiers may be used to identify which packets have been sent and/or received over the logical connection. For example, after a network connection failure, the first (or client) computer may provide the second computer (or database server) with the identifiers of the packets it has received. The second computer can use the identifiers received from the first computer to determine whether any packets were sent by the second computer but not received by the first computer. The second computer may then retransmit any packets accordingly.

In further embodiments, the packet identifiers may be used to identify a sequential order of the packets. In these embodiments, the sequential order defines the proper ordering in which the receiving computer (e.g. the client computer or the database server depending on whether the database transfer is a request or a response) is to process the packets. In these embodiments, the sequential identifier may be used similarly to the identifier described above for identifying packets that were sent but not received. However, in these embodiments, the receiving computer may only need to provide the sequential identifier of the last received packet in the sequence to identify which packets of the database transfer the receiving computer has received.

Although FIGS. 1 and 2 generally illustrate embodiments where a database response is sent from a database server to a client computer, the principles of the present invention apply equally to database requests sent from the client computer to the database server. For example, if during the transmission of a batch request from a client computer to a database server, a database connection fails, a second database connection within the same logical connection may be used to continue the transfer of the batch request. In such embodiments, the context ID is used to establish or reestablish database connections with the same context to ensure that the batch request may continue without interruption in spite of the failure in the database connection.

Further, although this specification has described logical connections as including multiple database connection using different physical network connections, it is to be understood that the present invention may also be implemented in virtual computing environments. For example, two physical computing devices may each host multiple virtual machines. There may only be a single physical network connection between the two computing devices (i.e. a physical connection between one NIC on each device). However, one of the devices may execute multiple client applications (e.g. one client application on each virtual machine) that each communicate with a database instance on the other device (e.g. one database instance on each virtual machine). The network connections between the client applications and database instances in this scenario would be virtual network connections between virtual network interfaces. The present invention also applies to these virtual environments in that multiple virtual network connections may be associated with a logical connection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for improving reliability of a connection between a client computer accessing a database at a second computer, the computer-implemented method comprising:

at a client computer, initiating a logical connection to a second computer containing a database, the logical connection comprising a plurality of network interface cards each providing a separate physical network connection to the database at the second computer, and the logical connection being initiated by using a first physical network connection to send a first request from the client computer for a first database connection to the second computer;

receiving at the client computer a response indicating that the first database connection is established;

generating a context identifier that is associated with said logical connection, the context identifier being generated at either the client computer or the second computer;

caching the context identifier at both the client computer and the second computer;

either concurrently with the first database connection or consecutively with the first database connection, the client computer sending a second request for a second database connection using a second physical connection of the logical connection, and the second request including the context identifier associated with the logical connection;

in response to the context identifier included with the second request, establishing the second database connection between the client computer and the second computer so that the logical connection is not disrupted even in the event of a failure of the first database connection; and receiving packets of a database transfer from the second computer through the second database connection of the logical connection even in the event of a failure of the first database connection.

2. The method of claim 1, wherein the first physical network connection is established via a first network interface card on the client computer, and the second physical network connection is established via a second network interface card on the client computer.

3. The method of claim 1, wherein the first and second physical network connections are established via the same network interface card on the client computer.

4. The method of claim 1, wherein the first request for the first database connection includes authentication criteria for authenticating the client computer to the second computer.

5. The method of claim 4, wherein the second request for the second database connection is authenticated using the authentication criteria supplied in the first request for the first database connection.

6. The method of claim 1, wherein the logical connection abstracts the physical network connections from the database to the second computer.

7. The method of claim 1, further comprising sending an indication to the second computer of which packets of the data transfer the client computer had received prior to failure of the first database connection to enable the second computer to determine whether any packets of the data transfer were sent but not received at the client computer over the failed first database connection.

8. A computer-implemented method for improving reliability of a connection between a client computer accessing a database at a second computer, the computer-implemented method comprising:

at a client computer, initiating a logical connection to a second computer containing a database, the logical connection comprising a plurality of network interface cards each providing a separate physical network connection to the database at the second computer, and the logical connection being initiated by using a first physical network connection to send a first request from the client computer for a first database connection to the second computer;

receiving at the client computer a response indicating that the first database connection is established;

generating a context identifier that is associated with said logical connection, the context identifier including an authentication mechanism and also representing one or more of a logical connection level context, a command level context or a resultsets level context, and the context identifier being generated at either the client computer or the second computer;

caching the context identifier at both the client computer and the second computer;

either concurrently with the first database connection or consecutively with the first database connection, the client computer sending a second request for a second database connection using a second physical connection of the logical connection, and the second request including the context identifier associated with the logical connection;

in response to the context identifier included with the second request, and without having to re-authenticate the logical connection, establishing the second database connection between the client computer and the second computer so that the logical connection is not disrupted even in the event of a failure of the first database connection; and receiving packets of a database transfer from the second computer through the second database connection of the logical connection even in the event of a failure of the first database connection.

9. The method of claim 8, wherein the first request for the first database connection includes the authentication mechanism for authenticating the client computer to the second computer, and wherein the second request for the second database connection is authenticated using the authentication mechanism supplied in the first request for the first database connection.

10. The method of claim 8, further comprising:

transmitting packets of a database transfer to the second computer over the first physical network connection of the logical connection; and in response to failure of the first physical network connection, switching to the second physical network connection to continue transmitting packets of the database transfer to the client computer.

11. A computer-implemented method for improving reliability of a connection between a client computer accessing a database at a server computer, the computer-implemented method comprising:

at a server computer, receiving from a client computer a request to initiate a logical connection to with the client computer, the logical connection comprising a plurality of network interface cards each providing a separate physical network connection to a database at the server computer, and the logical connection being initiated by using a first physical network connection to send a first request from the client computer for a first database connection to the server computer;

the server computer sending to the client computer a response indicating that the first database connection is established;

generating a context identifier that is associated with said logical connection, the context identifier being generated at either the client computer or the server computer;

caching the context identifier at both the client computer and the server computer;

either concurrently with the first database connection or consecutively with the first database connection, receiving at the server computer a second request for a second database connection using a second physical connection of the logical connection, and the second request including the context identifier associated with the logical connection;

in response to the context identifier included with the second request, establishing the second database connection between the client computer and the server computer so that the logical connection is not disrupted even in the event of a failure of the first database connection; and sending packets of a database transfer from the server computer through the second database connection of the logical connection even in the event of a failure of the first database connection.

12. The method of claim 11, wherein the server computer switches to the second physical network connection to send the database transfer to the client computer in response to failure of the first physical network connection.

13. The method of claim 11, wherein the second request for the second database connection is received from the client computer in response to failure of the first physical network connection.

14. The method of claim 11, further comprising:
at the server computer, comparing the context identifier included with the second request for the second database connection to a plurality of stored context identifiers; and
upon locating a matching context identifier, associating the context indicated by the matching context ID to the second database connection.

15. The method of claim 12, wherein the packets of the database transfer include identifiers which are used to identify which packets have been sent to the client computer, and wherein the second request for the second database connection includes the identifiers of the packets of the database transfer that the client computer has received prior to failure of the first physical network connection, and wherein the method further comprises:
comparing the identifiers in the second request for the second database connection to identifiers stored at the server computer for packets of the database transfer;
determining that at least one packet of the database transfer that was sent by the server computer over the first physical network connection was not received by the client computer; and
resending the at least one packet over the second physical network connection.

16. The method of claim 11 wherein the request for the first database connection includes authentication criteria for authenticating the client computer to the server computer, the method further comprising:
caching the authentication criteria with the context identifier of the logical connection; and
using the cached authentication criteria to re-authenticate the client computer when establishing the second database connection without requiring the client computer to supply the authentication criteria in the request for the second database connection.

17. The method of claim 11, wherein the first and second physical network connections are established either:
with the same network interface card on the client computer; or
with a first and a second network interface card respectively on the client computer.

18. The method of claim 11 wherein the context identifier is either:
received in the first request for the first database connection from the client computer; or
generated by the server computer in response to the first request for the first database connection from the client computer.

19. The method of claim 11, further comprising:
receiving a third request for one or more additional database connections from the client computer over one or more additional physical network connections, wherein the third request for the one or more additional database connections includes the context identifier of the logical connection;
establishing the one or more additional database connections and associating the context of the logical connection with the one or more additional database connections.

20. The method of claim 11, wherein the context identifier includes one or more of a logical connection level context, a command level context or a resultsets level context.

* * * * *